United States Patent

[11] 3,611,998

| [72] | Inventor | Nicholas R. Loscalzo<br>Melville, N.Y. |
|---|---|---|
| [21] | Appl. No. | 27,720 |
| [22] | Filed | Apr. 13, 1970 |
| [45] | Patented | Oct. 12, 1971 |
| [73] | Assignee | Petcraft Industries Incorporated<br>Melville, N.Y. |

[54] PET FEEDING BOWL
6 Claims, 3 Drawing Figs.

[52] U.S. Cl. ................................................ 119/61,
119/51, 150/.5, 220/70
[51] Int. Cl. ........................................ A01k 5/00,
A01k 7/00
[50] Field of Search .......................................... 119/51, 61;
220/9, 70, 69; 150/.5; D30/13, 16

[56] References Cited
UNITED STATES PATENTS

| 165,698 | 7/1875 | Alexander | 220/70 |
| 911,262 | 2/1909 | Perry | 220/70 X |
| 2,259,682 | 10/1941 | Collins | 119/61 |
| 2,867,940 | 1/1959 | Pitton | 119/61 X |
| 3,014,616 | 12/1961 | Kavanaugh et al. | 220/70 X |

*Primary Examiner*—Aldrich F. Medbery
*Attorney*—Stoll and Stoll

ABSTRACT: A bowl for pet food or the like having an outer wall forming a truncated conical surface and a floor portion integral with the outer wall which is sloped downwardly toward the deep end of the outer wall. A reinforcing web and a handle integral therewith may be provided on the outer wall together with a thumb notch in the deep portion of the outer wall above the handle.

PATENTED OCT 12 1971 3,611,998

INVENTOR.
NICHOLAS R. LOSCALZO
BY
Stoll and Stoll
ATTORNEYS

PET FEEDING BOWL

BACKGROUND OF THE INVENTION

1. Field of the Invention

Food bowls particularly for animal use.

2. Description of the Prior Art

Bowls of a vast variety are known to the art. Typically, such bowls have walls which are defined between substantially parallel planes and a floor which is substantially horizontal and parallel to the defining planes. In order to prevent food from spilling over the sidewalls of such prior art bowls, it has been a simple enough expedient to raise the height of the sidewalls thereby increasing the depth to the bowl floor and reducing spillage. A limitation on such an adjustment is the resulting inaccessibility of the floor of the bowl and the prior art was required to choose between high walls for cleanliness and low walls for convenience.

SUMMARY OF THE INVENTION

The present invention provides a food bowl which combines in a single unit the desirability of a high sidewall to reduce spillage and a low sidewall to increase convenience of access. The present invention also provides integral handle means for lifting the bowl from a surface.

Basically, and not by way of limitation, the present invention provides an outer wall forming a truncated conical surface the lower edge of which defines a substantially horizontal plane and the upper edge of which defines a plane which is not parallel to the bottom plane. The outer wall is therefore provided with a high or deep end and a low or shallow end. Formed integrally within the outer wall is a floor which is sloped downwardly into a pocket adjacent the deep end of the outer wall. Food placed in the bowl tends to flow or slide away from the shallow end of the outer wall and toward the deeper end thereof. The walls surrounding that pocket are relatively deep to prevent spillage yet access to the pocket over the low end of the wall is relatively convenient.

DESCRIPTION OF A PREFERRED EMBODIMENT OF THE INVENTION

Figure 1:
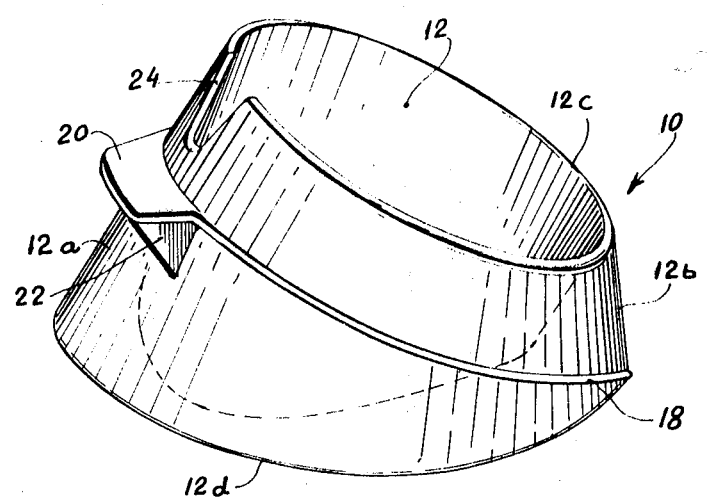
FIG. 1 is a perspective view of the pet feeding bowl of the present invention. The slope of the floor is shown in phantom.
Figure 3:
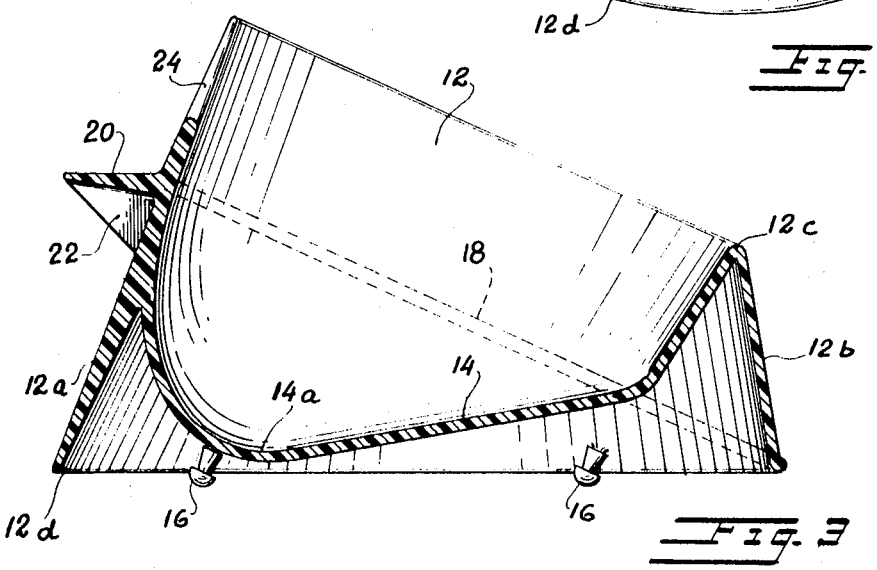
FIG. 3 is a cross-sectional view taken across line 3—3 of FIG. 2 and showing a reinforcing web in phantom.
Figure 2:
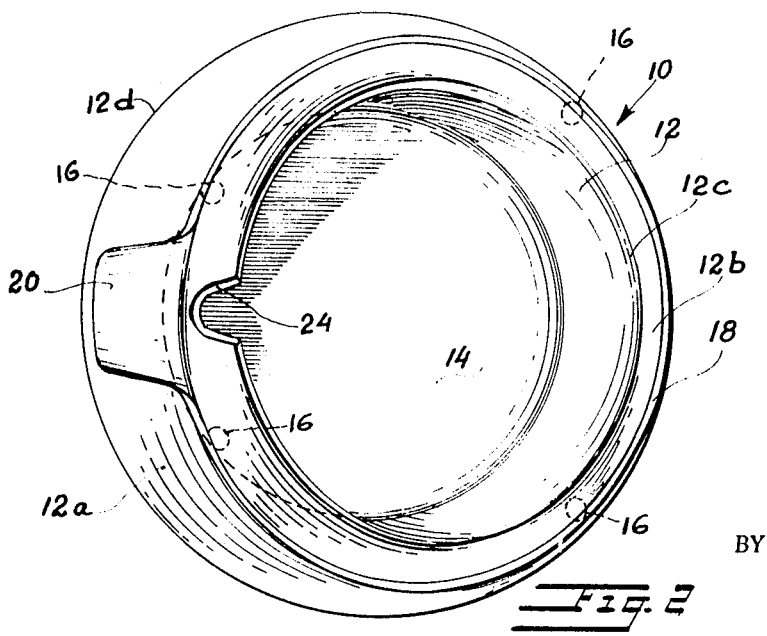
FIG. 2 is a top view of the pet feeding bowl of the present invention.

Referring to the drawing, pet feeding bowl 10 of the present invention comprises an outer wall 12 and an inner floor 14 integral with the outer wall.

Outer wall 12 forms a truncated conical surface; the conical surface may be oblique. The truncated conical surface as shown is defined as a section of a conical surface between two limiting nonparallel planes. An oblique conical surface is one in which the central axis is not perpendicular to the base thereof. Being defined between two nonparallel planes, outer wall 12 is provided with a relatively deep end 12a and a relatively shallow end 12b. The conical surface is arranged so that the outer wall 12 tapers inwardly in an upward direction. The bottom edge is intended to rest on or be close to a tabletop or other resting surface and the lower limiting plane is accordingly substantially horizontal.

Formed within outer wall 12 and continuously integral therewith to prevent leakage, floor 14 is sloped to form at a lower end a pocket 14a. Pocket 14a is defined of that portion of floor 14 which is closest to the lower limiting plane. It is an important feature of the invention that this portion is more closely adjacent deep wall 12a than shallow wall 12b. Food, particularly liquid food which is placed in the bowl, flows to the lowest accessible level which is pocket 14a. That pocket being cradled adjacent the lower portion of high wall 12a, the food is restrained from spilling.

The upper edge 12c of outer wall 12, which edge defines the upper limiting plane, is substantially circular and substantially perpendicular to the outer surface of deep wall end 12a. If the deep wall end 12a is at a preferred angle of 65° from the horizontal, then upper edge 12c forms an opening which is tilted approximately 25° from the horizontal. This angle together with low end wall 12b provides greatly improved and convenient access to the food in the bowl.

The lower edge 12d which defines the lower limiting plane is also substantially circular and may rest on a tabletop or other support. It is preferable, however, to provide pet feeding bowl 10 with feet 16 which extend slightly below the lower limiting plane and which may be rubber-tipped to prevent slippage. Feet 16 may be molded integrally with pet feeding bowl 10 beneath pocket 14a to carry the weight load of food and at outer wall 12 to provide maximum distance between the feet for stability.

Running circumferentially of outer wall 12 is a reinforcing web 18 which extends from bottom edge 12d at shallow end wall 12b around to a point approximately two-thirds of the way up deep end wall 12a. Extending horizontally outwardly of deep end wall 12a at reinforcing web 18 is a handle 20. To provide rigidity, a pair of flanges 22 may be provided beneath handle 20 and running to deep end wall 12a. Deep end wall 12a is provided with a recess or thumb notch 24 extending from upper edge 12c downwardly toward handle 20 for ease in carrying the bowl.

An angle of approximately 10° between the horizontal and floor 14 has been found to provide the preferred slope. Also, an angle of approximately 79° between the horizontal and shallow end wall 12b is provided.

While the foregoing is illustrative of a preferred embodiment of the invention, it is clear that other forms and modifications may be had within the teachings hereof. For example, feet 16 may be angled so as to be substantially parallel to deep end wall 12a to prevent the bowl from being moved toward the deep end by an exuberant eater pushing into the bowl. The pet feeding bowl of the present invention is intended to be molded in one piece from a suitable plastic to provide economy, cleanliness and anticorrosive properties together with a pleasing appearance.

What is claimed is:

1. A one-piece pet feeding bowl comprising:
    an oblique truncated outer wall with its smaller portion uppermost and having upper and lower edges, the lower edge defining a substantially horizontal plane and the upper edge defining a plane at an acute angle to the horizontal; said wall having a bottom portion disposed substantially at an acute angle to the horizontal at an angle inclined opposite to the angle of said upper edge and defining a feed pocket adjacent the highest portion of said outer wall.

2. A pet feeding bowl in accordance with claim 1, wherein:
    the upper edge of said wall is substantially circular and defines a plane which is substantially perpendicular to the highest portion of said outer wall.

3. A pet feeding bowl in accordance with claim 2, additionally comprising:
    a. a reinforcing web, said reinforcing web encircling said outer wall and extending from the lower portion of the shallow end of said outer wall to above the center of the deep end of said outer wall; and
    b. a handle being provided at the deep end of said outer wall.

4. A pet feeding bowl in accordance with claim 3, wherein:
    said deep end of said outer wall is provided with and defines a thumb notch above said handle.

5. A pet feeding bowl in accordance with claim 4, wherein:
    feet are provided on the bottom of said feeding bowl and extending below the bottom plane, at least one such foot being provided beneath the floor pocket.

6. A pet feeding bowl in accordance with claim 5, wherein:
    the highest portion of said outer wall defines an internal angle of approximately 65° from the horizontal and the shallow end of said outer wall defines an internal angle of approximately 79° from the horizontal.